United States Patent

[11] 3,594,502

[72] Inventor James M. Clark
Cedar Grove, N.J.

[21] Appl. No. 780,981
[22] Filed Dec. 4, 1968
[45] Patented July 20, 1971
[73] Assignee International Telephone and Telegraph Corporation
Nutley, N.J.

[54] A RAPID FRAME SYNCHRONIZATION SYSTEM
10 Claims, 14 Drawing Figs.

[52] U.S. Cl. .......... 178/69.5 R, 179/15 BS
[51] Int. Cl. .......... H04n 1/36
[50] Field of Search .......... 178/69.5; 179/15 BS; 340/177

[56] References Cited

UNITED STATES PATENTS

| | | | |
|---|---|---|---|
| 3,057,962 | 10/1962 | Mann et al. | 178/69.5 |
| 3,463,887 | 8/1969 | Sukehiro Ito | 178/69.5 |
| 3,482,044 | 12/1969 | Hisashi Kaneko | 178/69.5 |

*Primary Examiner*—Richard Murray
*Assistant Examiner*—George G. Stellar
*Attorneys*—C. Cornell Remsen, Jr., Walter J. Baum, Percy P. Lantzy, Philip M. Bolton, Isidore Togut and Charles L. Johnson ABSTRACT: A binary information signal having a given bit rate and a local binary synchronization reference signal are applied to a digital comparison circuit, the output signal thereof indicating a match or mismatch between the binary condition of successive adjacent bits of the information signal and the reference signal. A flip flop samples the output signal of the comparison circuit. A decision circuit responds to the samples from this flip flop to produce binary "0" when the decision level is exceeded and binary "1" when the decision level is not exceeded. This output signal is also coupled through an OR gate to an (N+1) bit shift register which is triggered by a burst of pulses at the bit rate. The previous inputs to the shift register are stored therein and the output thereof is also coupled through the OR gate. An AND-gate is coupled to the output of the first flip-flop of the shift register and the decision circuit and produces an output signal only when this flip flop indicates a mismatch and the decision circuit produces binary "1" during halt time. This output signal is coupled to an INHIBIT-gate disposed between a bit rate clock and binary counters to change the counting of the counters to achieve synchronization in less time than required by prior art frame synchronization systems.

INVENTOR
JAMES M. CLARK
BY Alfred C. Hill
AGENT

INVENTOR
JAMES M. CLARK
BY Alfred C. Hill
AGENT

INVENTOR
JAMES M. CLARK
BY Alfred C. Hill
AGENT

Fig. 9

| N = 3 | BIT 3 AND SHIFT REGISTER STAGE $B_3$ | BIT 2 AND SHIFT REGISTER STAGE $B_2$ | BIT 1 AND SHIFT REGISTER STAGE $B_1$ | BIT 0 AND SHIFT REGISTER STAGE $B_0$ |
|---|---|---|---|---|
| IN SHIFT REGISTER 18 | 0 | 0 | 0 | 0 |
| MMF INPUT TO OR 12 | D | C | B | A |
| IN SHIFT REGISTER 18 | D | C | B | A |
| MMF INPUT TO OR 12 | H | G | F | E |
| IN SHIFT REGISTER 18 | H+D | G+C | F+B | E |
| MMF INPUT TO OR 12 | L | K | J | I |
| IN SHIFT REGISTER 18 | L+H+D | K+G+C | J+F+B | I |
| MMF INPUT TO OR 12 | Q | P | N | M |
| IN SHIFT REGISTER 18 | Q+L+H+D | P+K+G+C | N+J+F+B | M |

Fig. 10A

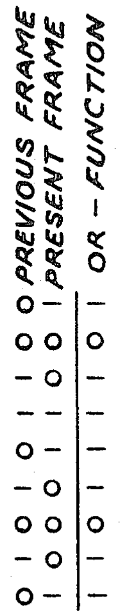

Fig. 8

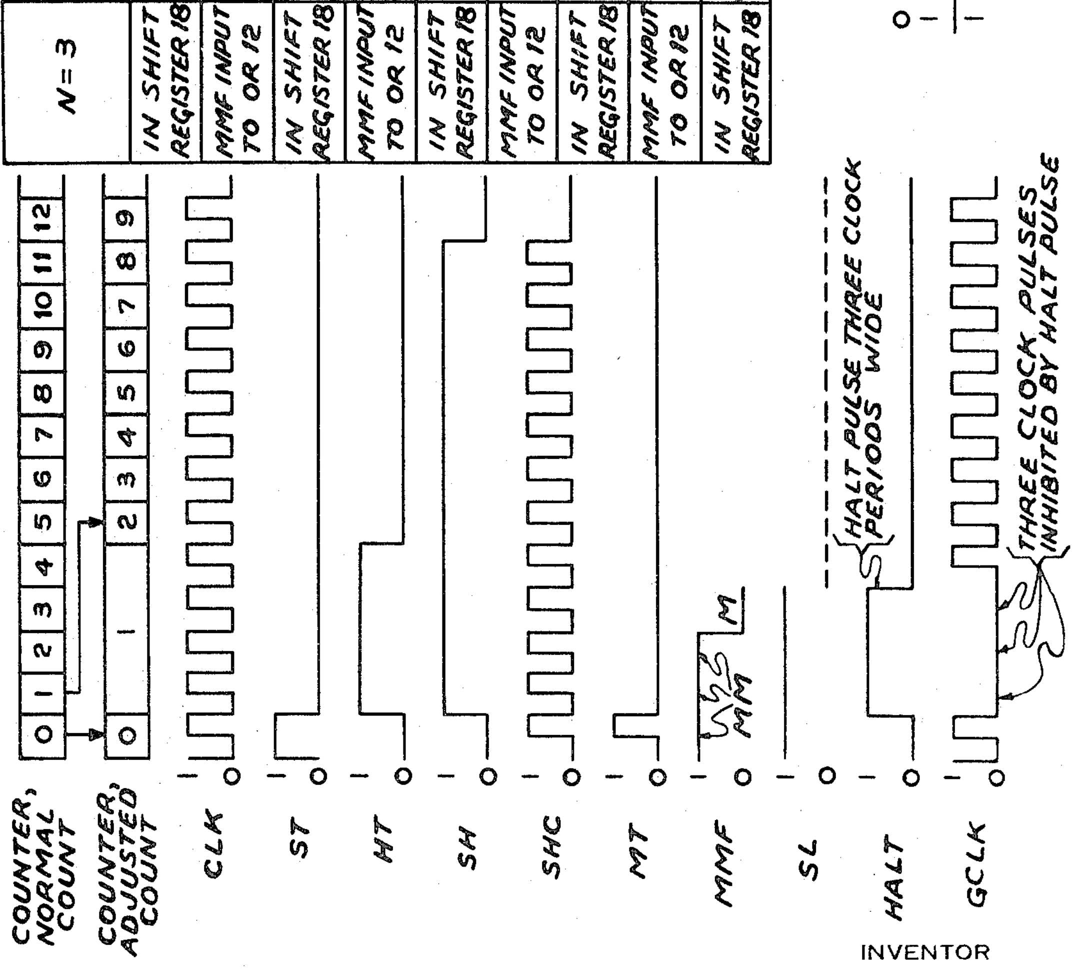

INVENTOR
JAMES M. CLARK
BY Alfred C. Hill
AGENT

PATENTED JUL 20 1971 3,594,502

SHEET 5 OF 5

INVENTOR
JAMES M. CLARK
BY Alfred C. Hill
AGENT

A RAPID FRAME SYNCHRONIZATION SYSTEM

BACKGROUND OF THE INVENTION

This invention relates to digital communication systems, such as time division digital multiplexers including pulse code modulation (PCM) equipment and more particularly to the frame synchronization systems employed therein.

Before proceeding, it should be noted that as employed herein the term "frame" is defined as one of a series of contingent periods of time during which there are data bits plus one or more synchronization bits with no data bits being present between synchronization bits. In addition, a "multiframe" is a period of time including one or more "frames," and sufficient to include one entire synchronization pattern.

In general, the bits of the synchronization codes vary from one frame to another within the multiframe, but are duplicated from one multiframe to the next.

There are three general types of synchronization codes to which the present invention will respond. First, a distributed type synchronization code including one bit per frame and usually two or more frames per multiframe. For instance, such a code would include 1 in one frame of the multiframe and a 0 in the other frame of the multiframe. Second, a lumped (character) type synchronization code including more than a few bits (one character) per frame, but one frame is a multiframe. Third, a synchronization code which falls between the first and second type of coder. This type of combined synchronization code would have two or more bits per frame, as well as two or more frames per multiframe with the plural synchronization bits being different in each frame of the multiframe.

The general problem is to establish and maintain frame synchronization of a digital communication link in the presence of noise or bit error. A frame synchronization circuit controls the timing counters of a digital multiplexer to make the counter timing synchronous with the format of the data received. This circuit has two primary functions (1) to sense when synchronization is lost and (2) to change the phase of the counters, as required, until synchronization is achieved. A reference synchronization pattern generated from the counters is compared with the incoming signal to detect whether or not the counters are synchronized. If synchronization is lost, the equipment will switch to a search mode. In the search mode, the phase of the counters are changed until it is detected that synchronism is achieved after which the frame synchronization system will change to a sense mode to detect a subsequent loss of synchronization.

With the distributed type synchronization code, the usual procedure is to sample one bit of each frame, advancing the phase of the counters by one bit each time a mismatch is sampled, except when an averaging or integrating circuit, which responds to the average rate of mismatches, has an output exceeding a certain threshold. The phase of the counters is usually advanced by deleting one clock pulse at the input to the counters, thus, causing the counters to halt momentarily. The threshold of the decision circuit will be exceeded when the mismatch rate is low, and will remain exceeded when the correct phase is reached. This prevents further halting.

When the lumped or combined type synchronization code is used, the input signal is shifted down a shift register, one character long. When the code in the shift register matches the expected synchronization code, the counters are reset to count corresponding to the normal time of arrival of the synchronization character. If the next synchronization code does not arrive as expected, shifting and comparing is repeated as before.

As may be determined from the foregoing, conventional frame synchronization circuits, particularly for the distributed type synchronization code, do not respond immediately, that is, within one bit time of the digital input because the action centers on the charge and discharge of a capacitor whose associated time constant is longer than one bit time. That is, for the conventional circuit, when an incoming digit bit is compared to the local synchronization reference signal and it does not match, the next digital bit to be examined is the next bit of the next frame.

The copending application of J. M. Clark, Ser. No. 781,181 filed Dec. 4, 1968, entitled "A Frame Synchronization System" discloses an embodiment of a frame synchronization system operating on a distributed type synchronization code that will reduce the search time by one-half the time employed by the conventional synchronization systems mentioned hereinabove operating on the same type of synchronization code.

SUMMARY OF THE INVENTION

An object of this invention is to provide a frame synchronization system which, with respect to the above-identified copending application, further reduces the time for achieving the desired synchronization.

Another object of this invention is the provision of a frame synchronization system operating on a distributed type synchronization code which reduces the time by $1/(2\sqrt{N+1})$ as compared with the conventional frame synchronization systems mentioned hereinabove operating on the same type of synchronization code.

A feature of this invention is to provide a frame synchronization system comprising a source of binary information signal having a given bit rate and containing a synchronization component; first means to produce a plurality of timing signals; second means coupled to the source and the first means to examine successive bits of the information signal to recognize the synchronization component and produce a resultant output signal; and third means coupled to the second means and the first means responsive to the present state of the resultant output signal and one of N cumulative functions of previous states of the resultant output signal, where N is an integer equal to at least one, to provide a control signal for timing adjustment of the timing signals when the resultant output signal indicates an out-of-synchronization condition until synchronization is achieved.

Another feature of this invention is the provision of the frame synchronization system of this invention wherein the first means further produces a local binary synchronization reference signal; and the second means includes digital comparison means coupled to the source and the first means to compare the binary condition of successive bits of the information signal and the binary condition of the reference signal and to produce the resultant signal.

BRIEF DESCRIPTION OF THE DRAWING

The above-mentioned and other features and objects of this invention will become more apparent by reference to the following description taken in conjunction with the accompanying drawings, in which:

FIG. 3 is a timing diagram illustrating the operation of one embodiment of a flip-flop that may be employed in the system of FIG. 2;

FIGS. 4 through 8 are timing diagrams illustrating the operation of the frame synchronization system of this invention for five different typical situations that may exist therein;

FIG. 9 is a table illustrating the cumulative effect when the mismatch function is OR-gated with the output of the shift register of FIG. 2;

FIGS. 10A, 10B and 10C illustrate the accumulation action of the shift register of FIG. 2;

FIG. 11 is a block diagram of one embodiment of an arrangement that may be substituted for the arrangement between lines A–A and B–B of FIG. 2 to achieve synchronization according to the present invention for a lumped type of synchronization code as defined herein; and FIG. 12 is a block diagram of one embodiment of an arrangement that may be substituted for the arrangement between line A–A and B–B of FIG. 2 to achieve synchronization according to the present invention for a combined lumped and distributed type of synchronization code as defined herein.

DESCRIPTION OF THE PREFERRED EMBODIMENT

Figure 1:
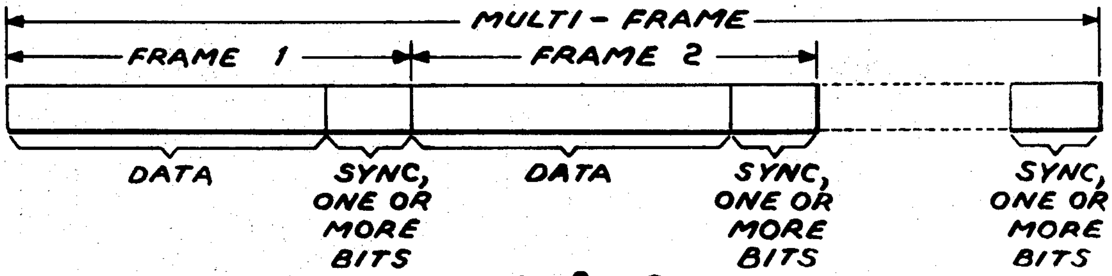
FIG. 1 is an illustration of a "frame" and a "multiframe" as defined hereinabove.

Referring to FIG. 1, the terms "frame" and "multiframe" as defined hereinabove are illustrated for the general case. For purposes of illustration, each frame, such as frames 1 and 2, includes data bits and one or more synchronization bits in the sequence illustrated. In the cases of the distributed and combined lumped and distributed synchronization codes, a multiframe includes two or more frames, such as frames 1 and 2. On the other hand, in the case of a lumped synchronization code, a multiframe includes only one frame, such as either frame 1 or frame 2. The distributed type has only one synchronization bit per frame. Assuming a specific synchronization code pattern of 10 for the distributed type synchronization code, there would be two frames per multiframe, and frame 1 would include a synchronization bit 1 in its synchronization time and frame 2 would include a synchronization bit 0 in its synchronization time. Assuming a specific synchronization code pattern of 101101 for the lumped type synchronization code, all six bits would appear once in one frame and in one multiframe. Assuming a specific synchronization code pattern of 101101, 010010 for the combined lumped and distributed code pattern, there would be two frames per multiframe, and frame 1 would include the synchronization bits 101101 in its synchronization time and frame 2 would include the synchronization bits 010010 in its synchronization time. The commas between the portions of the synchronization codes represent places for intervening data. Data also precedes and follows the synchronization code. The number of data bits in each place is the same.

As pointed out hereinabove, there are three general types of synchronization codes. The system of this invention will first be completely described employing a synchronization code or signal of the distributed type with the synchronization bit of each frame alternating between 1 and 1. Thus, the synchronization pattern will be 1, 0 in each multiframe.

The present invention describes a simple method of extracting more synchronization information out of the digital (binary) information input in given period of time and using the additional information to speed up the synchronization search.

When searching for frame synchronization, that is, when trying to determine which bits are synchronization bits, all of the bits are possible synchronization bits and, thus, all have useful information. However, it is common practice to assume that a particular bit is a synchronization bit and transferring this assumption to another bit when the assumed "synchronization bit" does not match the local synchronization reference signal. In doing so, all other bits are ignored. The only excuse for throwing away this information is equipment economy.

However, a shift register affords an economical means of checking several bits out of every frame, because it allows the logic to be done in serial form. This is essentially easy because the binary information is in serial form. If the shift register is (N+N1 1) bits or stages long, the N information bits immediately following the assumed synchronization bit are serially transferred to the shift register once per frame. In accordance with the present invention, this transfer, however, is accomplished by digitally comparing, such as EXCLUSIVE OR-ing, the information bits with the local synchronization reference signal and OR-ing the output of the EXCLUSIVE OR with the output of the shift register as will be described in greater detail hereinbelow.

Figure 2:
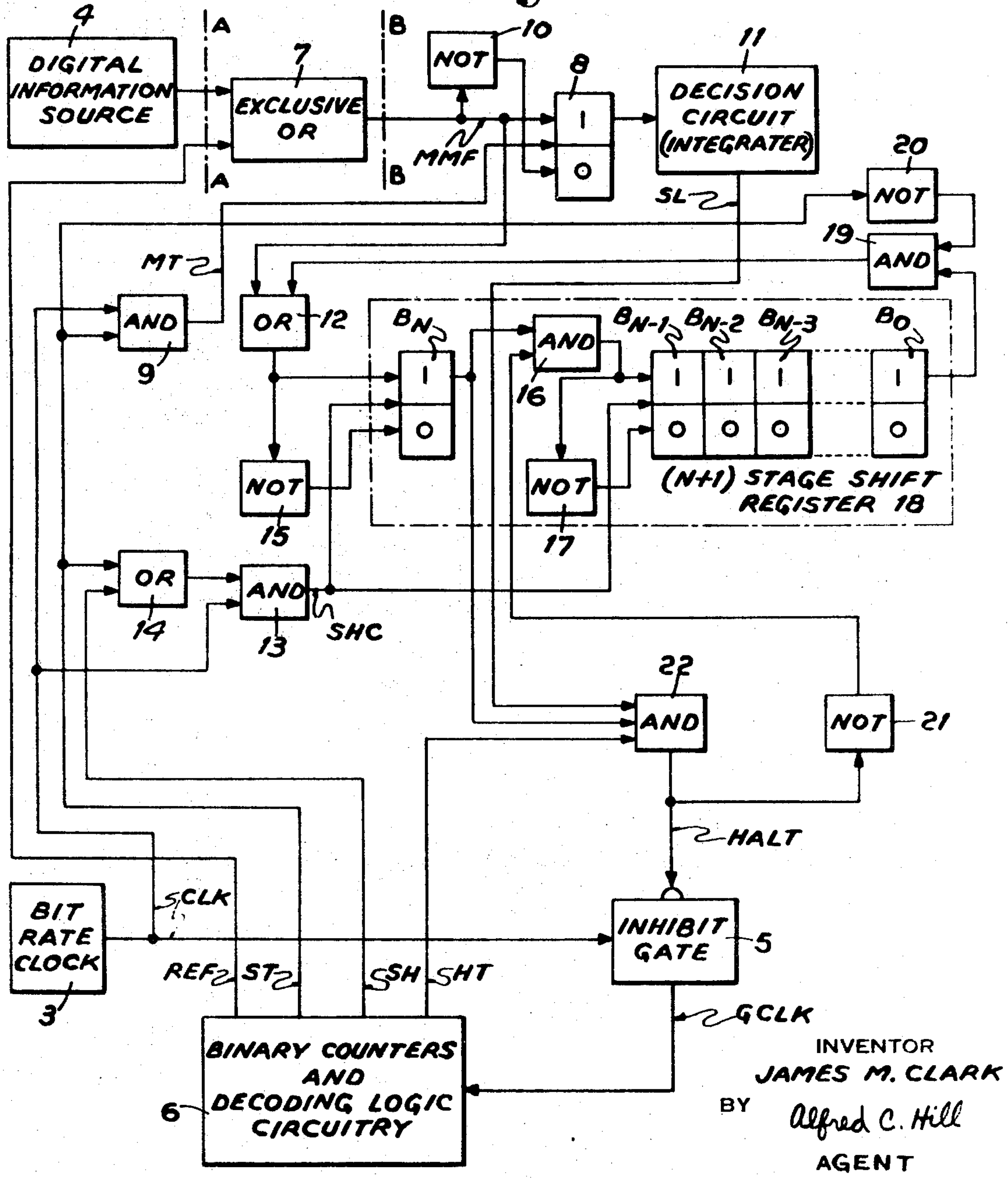
FIG. 2 is a block diagram of the frame synchronization system in accordance with the principles of this invention.

Referring to FIG. 2, there is illustrated therein a block diagram of one embodiment of the frame synchronization system of this invention. Clock 3 produces clock pulses at the bit rate of the input digital (binary) information signal from source 4 and is applied to INHIBIT-gate 5 and, hence, to binary counters and decoding logic circuitry 6 to produce various timing signals necessary to the operation of the frame synchronization system, as well as the timing signals necessary for other functions, such as to demultiplex the multiplexed signal received from source 4. For purposes of explanation, it will be assumed that the frame rate of the information signal is 8 kc., that the received one bit distributed synchronization code has the pattern in adjacent frames of 1,0 and that the local synchronization reference signal REF is a 4 kc. square wave. Other timing signals necessary in the operation of the frame synchronization system are generated by circuitry 6, namely, the synchronization bit time signal ST having a constant width of one clock period, the halt time signal HT having a variable width equal to the width of the HALT pulse plus the width of one clock period, and the shift register timing signal SH having a varying width equal to the width of $N$ clock periods plus the width of the HALT pulse. The timing relation of these pulses relative to the counting of the counters of circuitry 6 and the above width relations are illustrated in FIGS. 4 to 8.

The halt time signal HT is employed to prevent the frame synchronization system from locking in an unsynchronized and stationary condition upon power turn-on, since components 8, 11 and $B_N$ could otherwise assume a combination of states that would stop the counters of circuitry 6. The lack of timing signals would prevent flip-flop 8 and flip-flop $B_N$ of shift register 18 from leaving the above combination of states. By utilizing the halt time signal HT, the counters of circuitry 6 are allowed to stop only when timing signals are available to flip-flop 8 and flip-flop $B_N$ of shift register 18.

The information signal from source 4 and the local synchronization reference signal REF from circuitry 6 are applied to EXCLUSIVE OR-gate 7 which compares the binary conditions of successive bits of the information signal and the REF signal. Gate 7 will then produce a resultant output signal which indicates match and mismatch between the binary conditions of the two input signals applied thereto. The MMF signal is the resultant signal at the output of gate 7. The MMF signal is applied directly to flip-flop 8 which will be triggered by the MT signal produced at the output of AND-gate 9 which has its inputs coupled to clock 3 and the ST signal output from circuitry 6. The signal coupled from gate 7 to flip-flop 8 will be sampled by flip-flop 8 on the leading edge of the MT signal and the state of flip-flop 8 will be changed on the trailing edge of the MT signal for the type of flip-flop assumed for illustration. Thus, if the MMF signal is a binary 1, representative of a mismatch, the output from flip-flop 8 will be a 1 in time coincident with the trailing edge of the MT signal. The output from gate 7 is also coupled to a NOT or inverter circuit 10. Thus, when the MMF signal is 0, the output of the NOT 10 will be a 1 which will be sampled at the leading edge of the MT signal and at its trailing edge will cause flip-flop 8 to change its state, thus, producing at the 1 output of flip-flop 8 a binary 0 condition.

The output from flip-flop 8 is coupled to decision circuit 11 which determines whether the samples presented thereto indicate a synchronized condition. Decision circuit 9 is an integrating circuit that may take many forms, such as, an integrating filter circuit, a Miller type integrating circuit, or a reversible counter. A Miller integrating circuit is fully disclosed in the above cited copending application.

The output from circuit 7 is also coupled to an OR-gate 12 and, hence, directly to the 1 input of the first flip-flop $B_N$ of the (N+N +1) stage shift register 18 and through a NOT 15 to the 0 input of the same flip-flop. The triggering pulses SHC for flip-flop $B_N$ and the other stages of register 18 is produced by AND 13 which has one input coupled to the output of clock 3 and the other input coupled to the output of OR 14 whose two inputs are coupled to the ST and SH outputs of circuitry 6.

The output from flip-flop $B_N$ is coupled to AND 16 whose output is coupled to the next succeeding stage of shift register 18 directly and through NOT 17 as illustrated. In the remainder of register 18, the 1 and 0 outputs of one stage are coupled to the 1 and 0 inputs, respectively, of the succeeding stage. The output of register 18 is coupled to AND 19 with the other input thereof being provided by NOT 20 which is coupled to the ST output of circuitry 6. Thus, AND-gate 19 will be enabled only when the ST signal is in the 0 binary condition and is disabled when it is in the 1 condition. This permits information relating to all but the first of the N+1) previous samples of the MMF signal to be shifted through AND 19 and to the other input of OR 12 to provide a cumulative OR-function of the MMF signal of each frame phase, which in turn, is stored in register 18. The shifting of information from stage $B_N$ to stage $B_O$ and back to stage $B_N$ is triggered by signal SHC, which includes N+1+H consecutive clock pulses per frame, where H is the number of clock pulses inhibited by the HALT signal. However, the information is modified during this round trip by gates 19, 12 and 16 as described herein.

AND 16 is coupled to the output of NOT 21 whose input is coupled to the output of AND 22. Thus, in the absence of a HALT signal at the output of AND 22, AND 16 will permit the shifting of information from stage $B_N$ to stage $B_{N1}$of shift register 18 and normal counting continues in the counters of circuitry 6. In this case, signal SHC has (N++1) clock pulses per frame, occurring during counts 0 through N of counters 6. Since this is also the number of stages of shift register 18, each bit of information in shift register 18 will be shifted exactly one round trip and will return to its original position each frame period. The information bit originating from and returning to stage $B_S$ is OR-gated by OR-gate 12 with signal MMF when counters 6 are at count S, where S is any integer from 1 to N. The bit originating from $B_O$, however, is inhibited by AND-gate 19 because signal ST is in the 1 condition when counters 6 are at count 0 (see FIG. 4). After a number of frames, each stage $B_S$ stores an accumulated OR-condition of mismatches sampled at count S of each frame period.

When a HALT signal occurs at the output of AND 22, AND 16 is disabled and the information from stage $B_N$ is replaced by a zero condition shifted into stage $B_{N1}$so that when the zero condition is later shifted out of stage $B_O$, it can be OR-gated with new information at OR-gate 12. Also in this case, the H additional clock pulses per frame of signal SHC causes the information in shift register 18 to be shifted H positions more than a complete round trip. The timing is such that the bits originating from the H rightmost stages of shift register 18 are OR-gated (except for the first bit) with H consecutive bits of signal MMF at OR-gate 12; the resultant H bits are replaced by zeros at AND-gate 16; then these H zeros are OR-gated at OR-gate 12 with H bits of signal MMF at H phases (bit positions within the frame period of the input information) not previously sampled. When the shifting stops, the resultant H bits reside in the H leftmost stages of shift register 18.

AND 22 has three inputs, signal SL from decision circuit 11, the output from flip-flop $B_N$ and the HT signal from circuitry 6. The output signal of decision circuit 11 is in a 1 condition when the voltage therein is below the decision level voltage and is in a 0 condition when the voltage therein is above the decision level. It should also be noted than when the OR-function from OR 12 indicates a mismatch (binary 1) there will be a 1 at the output of flip-flop $B_N$. Thus, when any of the input signals to AND 22 are in the 0 binary condition there is no HALT or inhibit signal produced and the counters of circuitry 6 will count normally without interruption. However, when all the inputs to AND 22 are in binary condition 1, an output will be produced which is a HALT pulse coupled to gate 5 which will inhibit clock pulses from clock 3 and stop the counting action of the counters in circuitry 6 and a resultant shift in the phase or timing of the timing signals produced by circuitry 6. The amount of phase shift is dependent upon how many clock pulses are inhibited as will be explained hereinbelow.

Figures 3, 4, 5:
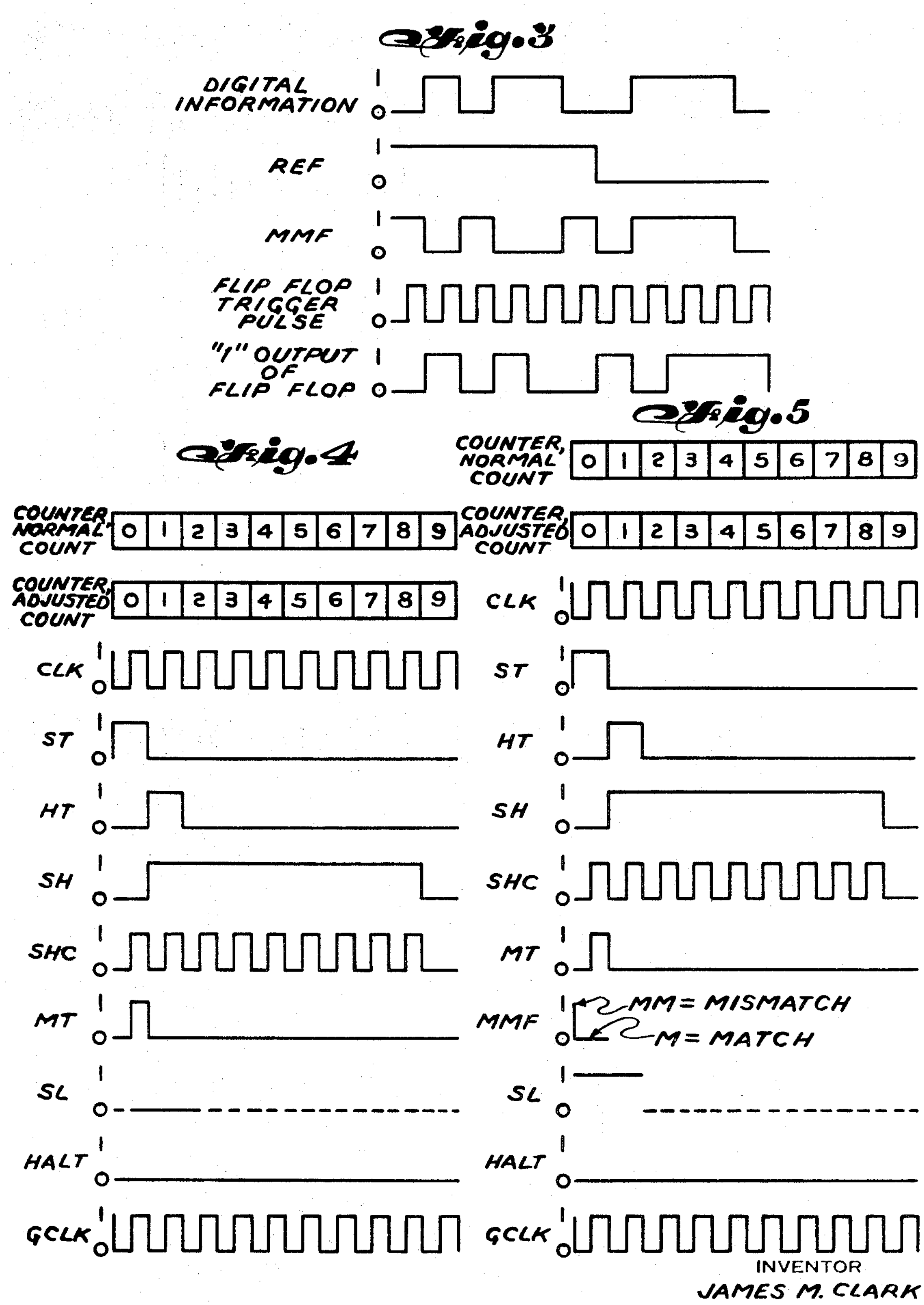

Referring to FIG. 3, there is illustrated therein, for one type of flip-flop that may be employed as the flip-flops in this system, the relationship between the DIGITAL INFORMATION signal, the local synchronization reference signal REF, the MMF signal from circuit (or the OR-function from OR 12) the clock pulses applied directly to either flip-flop 8 or flip-flop $B_N$ (without regard to their relationship with the timing signals ST and SH), and the resultant output of these flip-flops when triggered. It will be observed from these timing diagrams that the MMF signal is present at the output of these flip-flops advanced in time by one bit.

The following description will relate to the operation of the circuit of FIG. 2 for five different typical situations. It is assumed for the purpose of this explanation, that N is equal to 8. The letters identifying each signal will be found at the appropriate point of the circuit of FIG. 2.

Referring to FIG. 4, there is illustrated therein the timing diagram for situation one where the decision circuit voltage is above the decision level voltage, thereby, producing signal SL with a 0 binary condition. With this condition, regardless of the state of flip-flop $B_N$, AND 22 will be inactivated and no HALT signal will be produced and, hence, no inhibiting of the clock pulses of clock 3. Thus, the counters in circuitry 6 will count normally.

Referring to FIG. 5, there is illustrated therein a timing diagram for situation two wherein the voltage of decision circuit 11 is below the decision level voltage resulting in signal SL being equal to binary 1 and the first sample is a match. In this situation, there will be a 0 output from flip-flop $B_N$ due to the match during halt time signal HT resulting in inactivating AND 22 and, hence, no HALT pulse therefrom, thereby permitting the counters of circuitry 6 to proceed with their normal counting.

Figure 6:
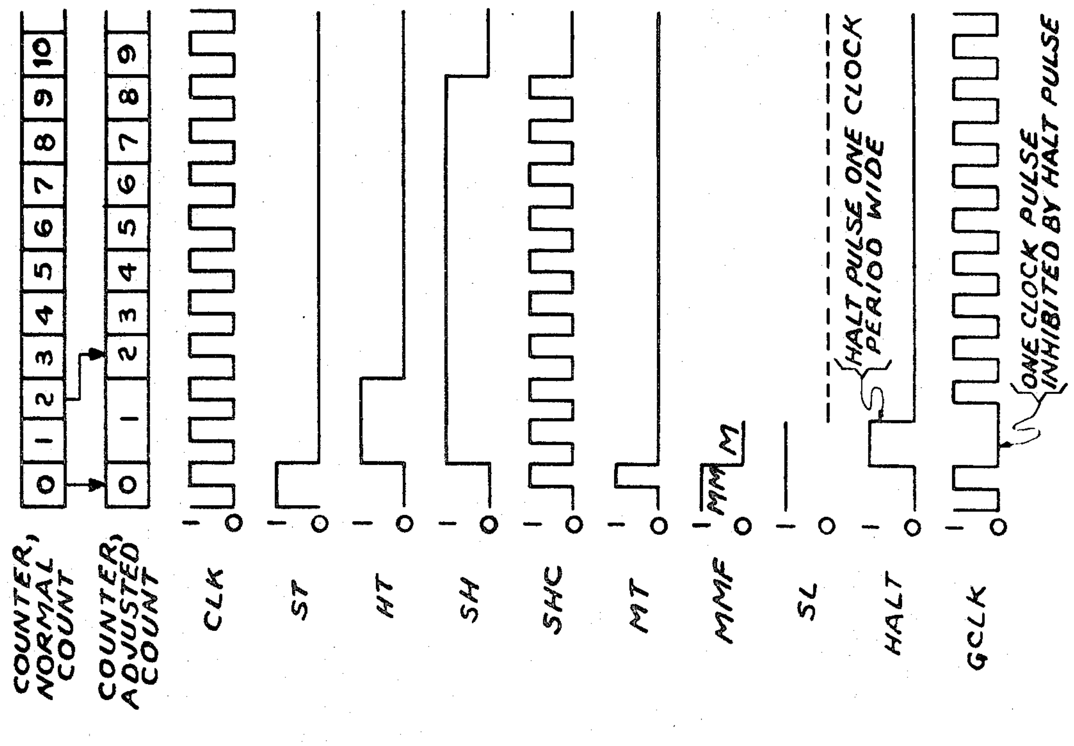

Referring to FIG. 6, there is illustrated therein the timing diagram for a third situation where the decision circuit voltage is below the decision level voltage resulting in signal SL being equal to 1, the first sample is a mismatch and the second sample is a match. In this situation there is an additional trigger pulse in signal SHC which is due to the fact that the HT and SH signals from circuitry 6 are extended in duration due to halting of the counting of the counters of circuitry 6. In other words, the counters stay in the state they had gone to just prior to the halting and, thus, signals HT and SH extended by a time of one bit period. In this situation, all the inputs to AND 22, at the time of the HT pulse, are in a 1 condition, remembering that the output of flip-flop $B_N$ is advanced one bit period. Thus, AND 22 is enabled for a time equal to one bit period resulting in a HALT pulse having a width of one clock of bit period wide. The production of the HALT pulse is stopped, since the match at the second sample and the one bit period shift in flip-flop $B_N$ results in a 0 to AND 22. This HALT pulse inhibits one clock pulse applied from clock 3 to the counters of circuitry 6. This changes the phase or timing of the timing signals at the output of circuitry 6.

Figure 7:
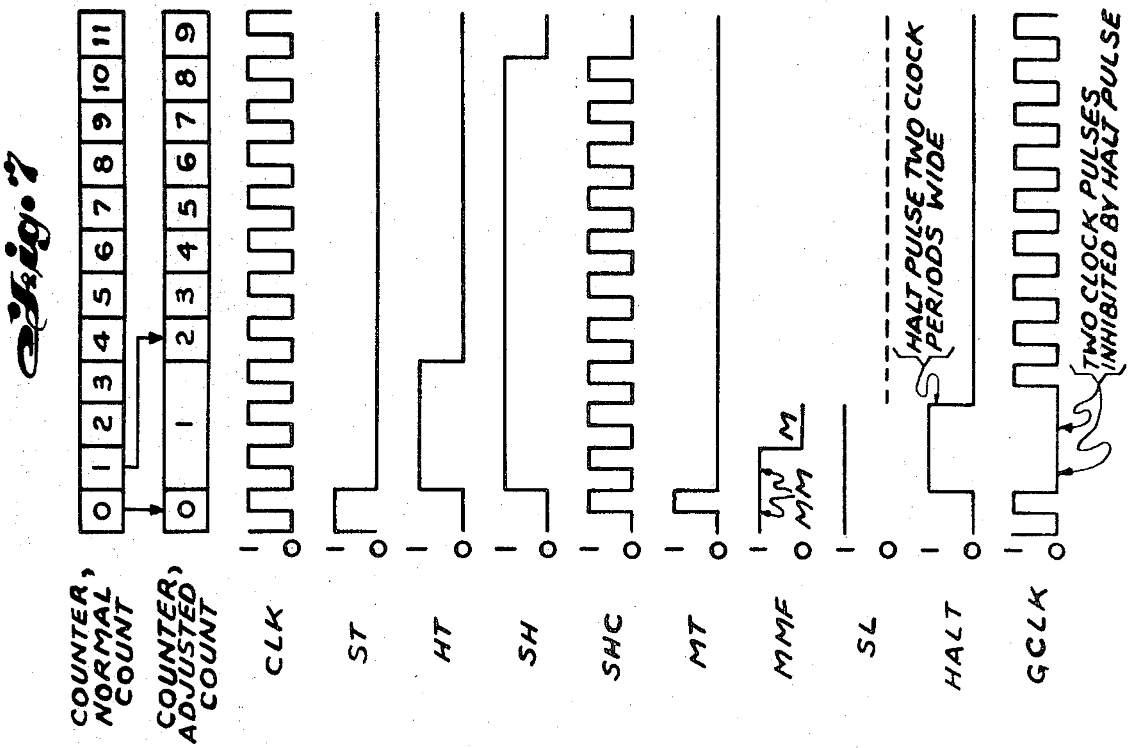

Referring to FIG. 7, there is illustrated therein a timing diagram for a fourth situation where the decision circuit voltage is below the decision level limit resulting in signal SL having a binary 1 condition, the first and second samples are mismatches and the third sample is a match. Here again, due to the halting of the counting of the counters of circuitry 6, the HT and SH signals are exceeded in duration by two bit periods, thereby permitting two extra trigger pulses in signal SHC. Thus, due to the bit period shift at the output of flip-flop $B_N$ with respect to the MMF signal, all the inputs to AND 22 are in the binary 1 condition resulting in a HALT pulse having a width two bit or clock periods wide, which inhibits two clock pulses from source 3 prior to application to the binary counters of circuitry 6. The production of the HALT pulse is stopped, since the match at the third sample and the one bit period shift in flip-flop $B_N$ results in a 0 to AND 22.

Referring to FIG. 8, there is illustrated therein the timing diagram of a fifth situation where the decision circuit voltage is below the decision level voltage resulting in SL signal being in a 1 binary state, the first, second and third samples are a mismatch and the fourth sample is a match. Here again, due to the HALT pulse, the HT and SH signals are extended in duration three bit periods, thereby permitting three extra trigger pulses in signal SHC. Thus, due to the bit period shift at the output of flip-flop $B_N$ with respect to the MMF signal, all the signals applied to AND 22 are in a 1 condition. This results in a HALT pulse having a width three bit or clock periods wide at the output of AND 22 which through the action of INHIBIT 5 inhibits three clock pulses from being applied to the counters of circuitry 6. The production of the HALT pulse is stopped, since the match at the fourth sample and the one bit period shift in flip-flop $B_N$ results in a 0 to AND 22.

Referring to FIG. 9, there is illustrated therein a table representing the cumulating process in OR 12 when AND 19 is enabled by the absence of the timing signal ST. For this table, it is assumed that N is equal to 3, and that there is no HALT pulse. The value of signal MMF when signal ST is equal to 1 is called bit 0, and the values of MMF in the following three bit periods are called bits 1, 2, and 3. Due to the fact that AND 19 is inhibited during the presence of signal ST the first bit applied to flip-flop $B_N$ and, hence, to shift register 18 is the condition of the MMF signal at the output of gate 7 without being OR-ed with the output from shift register 18. This is shown in the last column of the table of FIG. 8. The first bit (bit 0) from OR 12, appears in the last stage $B_0$ of register 18 and the fourth bit (bit 3) from OR 12 appears in the first stage $B_N$ of register 18. The other columns illustrate the cumulating effect of OR gate 12 when the information is shifted out of shift register 18 under control of the trigger pulses SHC through OR 12.

Figures 10B, 10C, 11, 12:
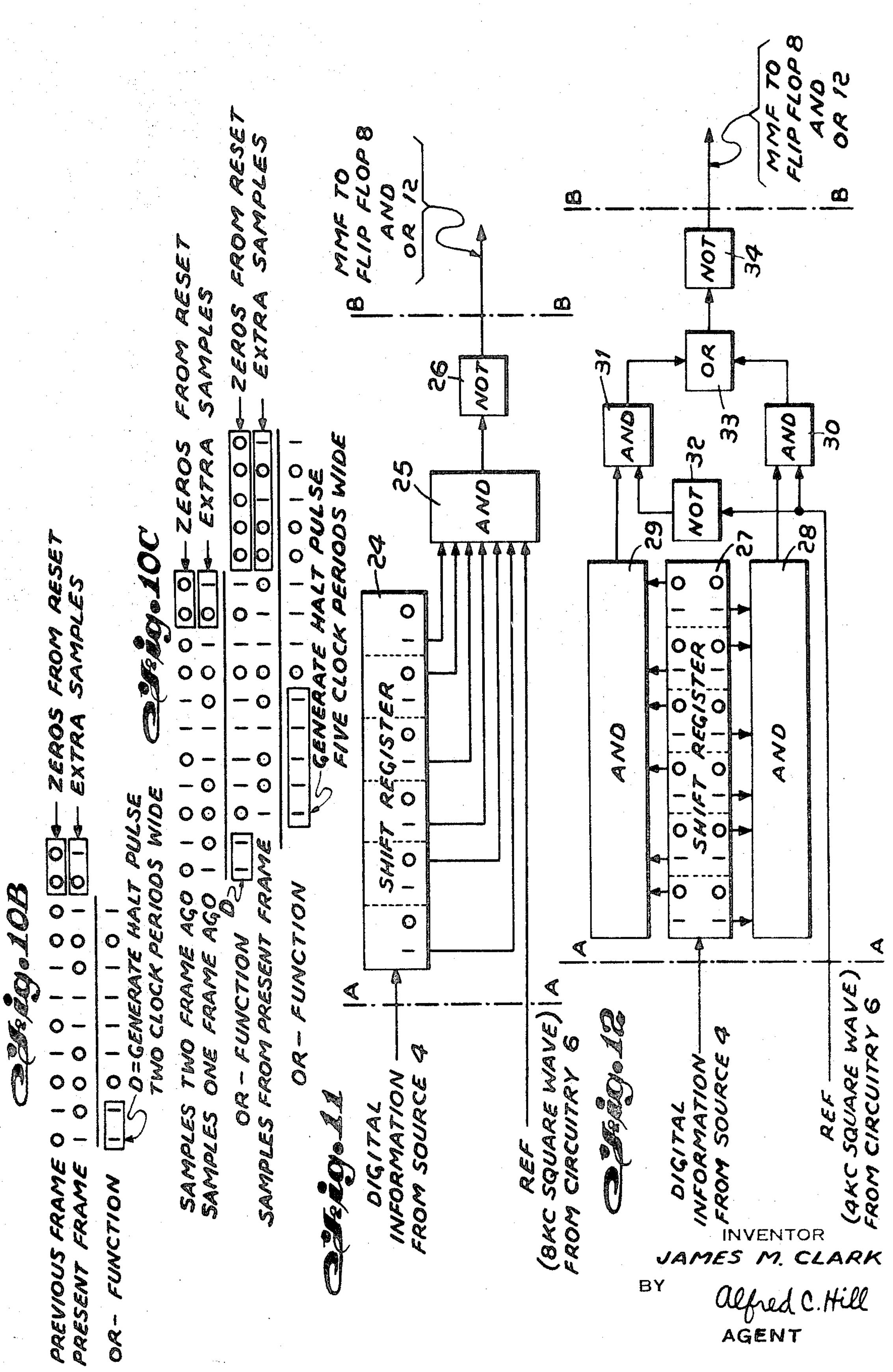

Referring to FIGS. 10A to 10C, there is a further illustration of the accumulation action of shift register 18 which is the key to the speed improvement obtained in the system of the present invention. The mismatch sampling shift register 18 accumulates and stores information on the eight frame phases where $N$=8, following the tentatively "correct" frame phase as well as sampling the MMF signal from gate 7 by signal SHC in stage $B_N$ of register 18 of the tentatively "correct frame phase." The information stored for each phase is an OR-function as generated by OR 12 of all mismatch samples which indicates whether at least one mismatch has been sampled. A mismatch is stored as a 1 and a match is stored as a 0. For example, the mismatch function for the tentatively correct phase and the following $N$=8 phases might be as illustrated in FIG. 10A, labeled previous frame. Since the first 0 indicates a match, there is no halt. The ones and zeros of this example are stored, and one frame period later are OR-gated in OR 12 with the MMF signal from gate 7 samples in stage $B_N$ of register 18 at corresponding phases, which at this next frame might be, for example, as illustrated in FIG. 10A, labeled present frame. The OR-function is generated by OR 12 as indicated in FIG. 10A. As the OR-function is being generated, it is also being used, through stage $B_N$ of register 18 and AND 22, to control the halt or INHIBIT 5. Provided that the other signals ST, SHC, HT, etc. are in the 1 state, the first 1's will cause the counters of circuitry 6 to halt for two bit or clock periods, as indicated in FIG. 10B, thereby changing the phase of the counters of circuitry 6 by two bit periods. This also causes two bits circulating in register 18 to be reset to zero, and two additional samples to be shifted into register 18. Assuming, for example, that these two samples are 01, the diagram of FIG. 10A may be expanded into the diagram of FIG. 10B. The tentatively correct phase is now changed from the first column to the third column (reading from left to right), because the HALT pulse of two bit periods wide means that the phases represented by the first two columns have been rejected. One frame later, the OR-function, from OR 12, is generated as illustrated in the bottom three lines of FIG. 10C. In this example, there is a halt for five bit periods, five bits are reset, and five extra samples are stored. Notice also, that the first halt is caused by a mismatch samples from the present frame, but the second halt is caused by a mismatch stored or "remembered" by register 18 from two frames ago. The additional sampling of the output of register 18 makes the search for the correct frame phase proceed an average of six times faster than prior art for the case of $N$=8.

It has been determined that because of the insertion of register 18 the time required to bring the system back into synchronization after synchronization is lost is decreased to a value of $1/(2\sqrt{N+1})$(an empirical relationship) the time normally required by the prior art frame synchronization system operating on a distributed synchronization code, at least when N is small compared to the number of data bits per frame. In addition, it should be pointed out that this circuit arrangement by employing the shift register also results in a further reduction of $1/\sqrt{N+1}$ with respect to the time required by the frame synchronization system disclosed in the above-identified copending application.

Referring to FIG. 11, there is illustrated a digital comparison means that may be substituted for EXCLUSIVE OR 7 of FIG. 2 between lines A–A and B–B to render the synchronization system of this invention applicable to the lumped type synchronization code. As assumed, hereinabove, for purposes of explanation, the lumped synchronization code pattern is 101101. Successive bits of the information signal are shifted into a six stage shift register 24, each stage including, for instance, a flip-flop The appropriate 1 or 0 output of each flip-flop of register 24 is coupled to AND-gate 25, as illustrated, to recognize the assumed lumped code pattern. AND 25 also has coupled thereto the REF signal from circuitry 6 which in this embodiment, for the example employed herein, would be an 8 kc. square wave properly phased to have a 1 state at the time when the synchronization code should be present. When a 1 appears on all inputs to AND 25, a match is present and a 1 appears at the output of AND 25. When a 0 appears on any one of the inputs to AND 25, a mismatch is present and a 0 appears at the output of AND 25. However, these outputs from AND 25 are opposite to the requirements of the MMF function from gate 7 wherein a match is represented by 0 and a mismatch is represented by a 1. To overcome this inversion, the output signal of AND 25 is coupled to NOT 26 to provide an MMF signal at the output of the digital comparison means of FIG. 11 having identical representation as the MMF output signal of gate 7, FIG. 2. Therefore, the remainder of the circuit of FIG. 2 will operate as previously described.

Employment of the system of FIG. 2 with the digital comparison means of FIG. 11 for a lumped synchronization code will result in a reduction of search time relative to the search time of related prior art but it does not appear that the reduction of search time will be as great as that achieved by the system of FIG. 2 for a distributed synchronization code.

Referring to FIG. 12, there is illustrated a digital comparison means that may be substituted for EXCLUSIVE OR 7 of FIG. 2 between lines A–A and B–B to render the synchronization system of this invention applicable to the combined lumped and distributed synchronization code. As assumed hereinabove, for purposes of explanation, this combined synchronization code pattern is 101101, in one frame of a two frame multiframe, and 010010, in the other frame of the two frame multiframe. Successive bits of the information signal are shifted into a six stage shift register 27, each stage, including, for instance, a flip-flop. The appropriate 1 or 0 output of each flip-flop of register 27 is coupled to AND 28, as illustrated, to recognize the assumed code pattern 101101 and the appropriate 1 or 0 output of each flip-flop of register 27 is coupled to AND 29, as illustrated, to recognize the assumed code pattern 010010. A 1 output from AND 28 indicates that the code 101101 has been recognized while a 1 output from AND 29 indicates that the code 010010 has been recognized. One input of AND 30 is coupled to the output of AND 28 and the other input of AND 30 receives the REF signal directly from circuitry 6 which in this embodiment, for the example employed herein, would be a 4 kc. square wave properly phased to have a 1 state at the time when the synchronization code 101101 should be present in the one frame of the two frame multiframe. One input of AND 31 is coupled to the output of AND 29 and the other input of AND 31 receives the REF signal from circuitry 6 through NOT 32 to provide the REF signal with a 1 state at the time when the synchronization code 010010 should be present in the other frame of the two frame multiframe. The outputs of AND's 30 and 31 are coupled to OR 33. When signal REF is 0, the output of NOT 32 will be 1, allowing the condition from AND 29 to appear at the output of AND 31, and the output of AND 30 will be 0, allowing the condition from AND 31 to appear at the output of OR 33, which will be the condition of AND 29. However, when the signal REF is 1, the condition of AND 28 will appear at the output of AND 30, and the output of NOT 32 will be 0, making the output of AND 31 0, which will allow the condition from AND 30 to appear at the output of OR 33, which will be the condition of AND 28. Thus, the condition of signal REF selects whether the condition of AND 29 (or else of AND 28) will appear at the output of OR 33. Since the outputs of AND 28 and AND 29 indicate a match (if 1) of a mismatch (if 0) of the input information and the associated codes, the output of OR 33 will indicate in the same manner a match or a mismatch of the input information with the code selected by the condition of the signal REF. It should be noted that the output signal from OR 33 is opposite to the requirements of the MMF function from gate 7 wherein a match is represented by 0 and a mismatch is represented by a 1. To overcome this inversion, the output signal of OR 33 is coupled to NOT 34 to provide a MMF signal at the output of the digital comparison means of FIG. 12 having identical representations as the MMF output signal of gate 7, FIG. 2. Therefore, the remainder of the circuit of FIG. 2 will operate as previously described.

Employment of the system of FIG. 2 with the digital comparison means of FIG. 12 for a combined lumped and distributed synchronization code will result in a reduction of search time relative to the search time of related prior art which appears to be of the same magnitude, at least for some cases, as that achieved by the system of FIG. 2 for a distributed synchronization code.

While I have described above the principles of my invention in connection with specific apparatus, it is to be clearly understood that this description is made only by way of example and not as a limitation to the scope of my invention as set forth in the objects thereof and in the accompanying claims.

I claim:

1. A frame synchronization system comprising:
a source of binary information signal having a given bit rate and containing a synchronization component having a predetermined repetition frequency;
first means to produce a plurality of timing signals, said timing signals including at least a synchronization reference signal in the form of a rectangular wave signal having a repetition frequency equal to said predetermined repetition frequency and a duration greater than the duration of said synchronization component;
second means coupled to said source and said first means responsive to said information signal and said reference signal to examine successive bits of said information signal with respect to said reference signal to detect said synchronization component and produce a resultant output signal at each examination; and
third means coupled to said second means and said first means responsive to the present state of said resultant output signal and one of N cumulative functions of previous states of said resultant output signal, where N is a integer equal to the least two, to provide a control signal for timing adjustment of said timing signals when said resultant output signal indicates an out-of-synchronization condition until synchronization is achieved.

2. A system according to claim 1, wherein
said second means includes
digital comparison means coupled to said source and said first means to compare the binary condition of successive bits of said information signal and the binary conditions of said reference signal and to produce said resultant signal.

3. A system according to claim 2, wherein
said digital comparison means includes
an EXCLUSIVE OR-gate.

4. A system according to claim 2, wherein
said first means includes
a source of clock signals having said given rate, binary counting means,
decoding means coupled to said counter means to produce said timing signals, and said reference signal and
inhibit means coupled between said source of clock signals and said counter means and to said third means responsive to said control signal to carry out said timing adjustment.

5. A system according to claim 2, wherein
said third means includes
fourth means having a decision level coupled to said second means to produce a binary 1 output when the voltage therein resulting from said resultant output signal is less than said decision level and a binary 0 output when the voltage therein resulting from said resultant output signal is greater than said decision level.

6. A system according to claim 5, wherein
said third means further includes
an (N++1) stage shift register to store said N cumulative functions of previous states.

7. A system according to claim 6, wherein
said third means further includes
an OR-gate having two inputs, one input being coupled to said second means and the other input being coupled to the output of said shift register, and
fifth means coupled to said fourth means and the output of the first stage of said shift register to produce said control signal when said fourth means produces a binary 1 output and simultaneously the output signal of said first stage is a binary 1.

8. A system according to claim 7, wherein
said fifth means includes
an AND-gate.

9. A system according to claim 8, further including
a bistable means coupled between said second means and said fourth means.

10. A system according to claim 2, wherein
said first means includes
a source of clock signal having said given rate,
binary counter means,
decoding means coupled to said counter means to produce said timing signal and said reference signal, and
inhibit means coupled between said source of clock signal and said counter means;
said digital comparison means includes
an EXCLUSIVE OR-gate; and
said third means includes
fourth means having a decision level coupled to said EXCLUSIVE OR-gate to produce a binary 1 output when the voltage therein resulting from said resultant output signal is less than said decision level and a binary 0 output when the voltage therein resulting from said resultant output signal is greater than said decision level,
an (N+1) stage shift register to store said N cumulative functions of previous states,
an OR-gate having two inputs, one input being coupled to said EXCLUSIVE OR-gate and the other input being coupled to the output of said shift register, and
an AND-GATE coupled to said fourth means and the output of the first stage of said shift register to produce said control signal for coupling said inhibit means to carry out said timing adjustment, said control signal being produced when said fourth means produces a binary 1 output and simultaneously the output signal of said first stage is a binary 1.